(12) United States Patent
Yanagawa et al.

(10) Patent No.: US 11,465,584 B2
(45) Date of Patent: Oct. 11, 2022

(54) WEBBING TAKE-UP DEVICE

(71) Applicant: KABUSHIKI KAISHA TOKAI-RIKA-DENKI-SEISAKUSHO, Aichi (JP)

(72) Inventors: Wataru Yanagawa, Aichi (JP); Shigeki Hashimoto, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 173 days.

(21) Appl. No.: 16/970,227

(22) PCT Filed: Jan. 29, 2019

(86) PCT No.: PCT/JP2019/003004
§ 371 (c)(1),
(2) Date: Aug. 14, 2020

(87) PCT Pub. No.: WO2019/163444
PCT Pub. Date: Aug. 29, 2019

(65) Prior Publication Data
US 2021/0114549 A1 Apr. 22, 2021

(30) Foreign Application Priority Data
Feb. 23, 2018 (JP) .............................. JP2018-031170

(51) Int. Cl.
*B60R 22/34* (2006.01)
*B60R 22/343* (2006.01)

(52) U.S. Cl.
CPC ................................. *B60R 22/343* (2013.01)

(58) Field of Classification Search
CPC ... B60R 22/34; B60R 22/343; B60R 22/4628; B60R 2022/4642
See application file for complete search history.

(56) References Cited

U.S. PATENT DOCUMENTS

| | | | |
|---|---|---|---|
| 8,616,484 B2 * | 12/2013 | Ito | B60R 22/4628 242/374 |
| 2019/0047510 A1 | 2/2019 | Yanagawa et al. | |
| 2020/0231115 A1 * | 7/2020 | Tanaka | B60R 22/4633 |
| 2020/0384946 A1 * | 12/2020 | Tanaka | B60R 22/4628 |

FOREIGN PATENT DOCUMENTS

JP 2017-144891 A 8/2017

\* cited by examiner

*Primary Examiner* — Sang K Kim
(74) *Attorney, Agent, or Firm* — Calderon Safran & Cole P.C.

(57) ABSTRACT

In a webbing take-up device, a moving member is moved while being guided along a cylinder in order to rotate a spool in a take-up direction. A urging plate of a guide member urges a flange at an axial direction leading end portion of the cylinder toward a restricting direction side, and a leg plate of a frame restricts rotation of the flange toward the restricting direction side. This enables rattling of the axial direction leading end portion of the cylinder about the axial direction of the cylinder to be suppressed.

8 Claims, 10 Drawing Sheets

WEBBING TAKE-UP DEVICE

CROSS-REFERENCE TO RELATED APPLICATIONS

The present application is a U.S. National Phase of PCT/JP2019/003004 filed on Jan. 29, 2019, claiming priority under 35 USC 119 from Japanese Patent Application No. 2018-031170 filed Feb. 23, 2018, the disclosure of which is incorporated by reference herein.

TECHNICAL FIELD

The present invention relates to a webbing take-up device in which a moving member is moved in one direction to rotate a spool in a take-up direction.

BACKGROUND ART

In a webbing take-up device disclosed in Japanese Patent Application Laid-Open (JP-A) No. 2017-144891, a rack is guided by a pipe and moved toward an axial direction leading end side such that a spool is rotated in a take-up direction.

In this webbing take-up device, rotation of an axial direction leading end portion of the pipe about its axial direction is restricted by a support portion of a frame.

SUMMARY OF INVENTION

Technical Problem

In consideration of the above circumstances, an object of the present invention is to obtain a webbing take-up device capable of suppressing rattling of a guiding member about one direction.

Solution to Problem

A webbing take-up device of a first aspect of the present invention includes a spool configured to be rotated in a take-up direction to take up a webbing of a seatbelt device, a moving member configured to be moved in one direction to rotate the spool in the take-up direction, a guiding member configured to guide movement of the moving member in the one direction, a force application portion configured to apply rotation force about the one direction to the guiding member, and a restricting section configured to restrict the guiding member from being rotated about the one direction by the force application portion.

A webbing take-up device of a second aspect of the present invention is the webbing take-up device of the first aspect of the present invention, further including an additional guiding member that is provided with the force application portion and that is configured to guide the moving member as the moving member moves from the guiding member in the one direction.

A webbing take-up device of a third aspect of the present invention is the webbing take-up device of the first aspect or the second aspect of the present invention, further including an assembly section that is assembled to the guiding member, and wherein the restricting section is configured to restrict rotation of the guiding member during assembly of the assembly section to the guiding member.

A webbing take-up device of a fourth aspect of the present invention is the webbing take-up device of any one of the first aspect to the third aspect of the present invention, further including a limiting portion that is disposed on a side toward which the force application portion is deformed by the guiding member, and that is configured to limit deformation of the force application portion by the guiding member.

A webbing take-up device of a fifth aspect of the present invention is the webbing take-up device of any one of the first aspect to the fourth aspect of the present invention, further including a peripheral portion that is provided at a periphery of the guiding member, at which the force application portion applies the rotation force about the one direction to the guiding member and the restricting section restricts the guiding member from being rotated about the one direction by the force application portion, and at which movement of the guiding member in the one direction and in another direction is restricted.

Advantageous Effects of Invention

In the webbing take-up device of the first aspect of the present invention, the moving member is moved in the one direction while being guided by the guiding member such that the spool is rotated in the take-up direction and thus the webbing of the seatbelt device is taken up.

The force application portion applies rotation force about the one direction to the guiding member, and the restricting section restricts the guiding member from being rotated about the one direction by the force application portion. This enables rattling of the guiding member about the one direction to be suppressed.

In the webbing take-up device of the second aspect of the present invention, the additional guiding member guides the moving member as it moves from the guiding member in the one direction.

The force application portion is provided at the additional guiding member. This obviates the need to provide the force application portion separately to the additional guiding member.

In the webbing take-up device of the third aspect of the present invention, the assembly section is assembled to the guiding member.

The restricting section restricts the guiding member from rotating during assembly of the assembly section to the guiding member. The restricting section is thus capable of restricting rotation of the guiding member during assembly of the assembly section to the guiding member.

In the webbing take-up device of the fourth aspect of the present invention, the limiting portion is disposed on the side toward which the force application portion is deformed by the guiding member. The limiting portion limits the deformation of the guiding member by the force application portion. The force application portion is thus capable of effectively applying the rotation force about the one direction to the guiding member.

In the webbing take-up device of the fifth aspect of the present invention, the peripheral portion is provided at the periphery of the guiding member. At the peripheral portion, the force application portion applies the rotation force about the one direction to the guiding member and the restricting section restricts the guiding member from being rotated about the one direction by the force application portion. At the peripheral portion, movement of the guiding member in the one direction and in the other direction is restricted. Thus, the force application portion can easily apply the rotation force about the one direction to the guiding member, and the restricting section can easily restrict the guiding member from being rotated about the one direction by the force application portion and also restrict movement of the guiding member in the one direction and in the other direction.

DESCRIPTION OF EMBODIMENTS

Explanation follows regarding an exemplary embodiment of the present invention, with reference to FIG. 1 to FIG. 7. Note that in the drawings, the arrow FR indicates a vehicle front side, the arrow OUT indicates a vehicle width direction outside, and the arrow UP indicates a vehicle upper side.

Configuration of Present Exemplary Embodiment

Figure 1:
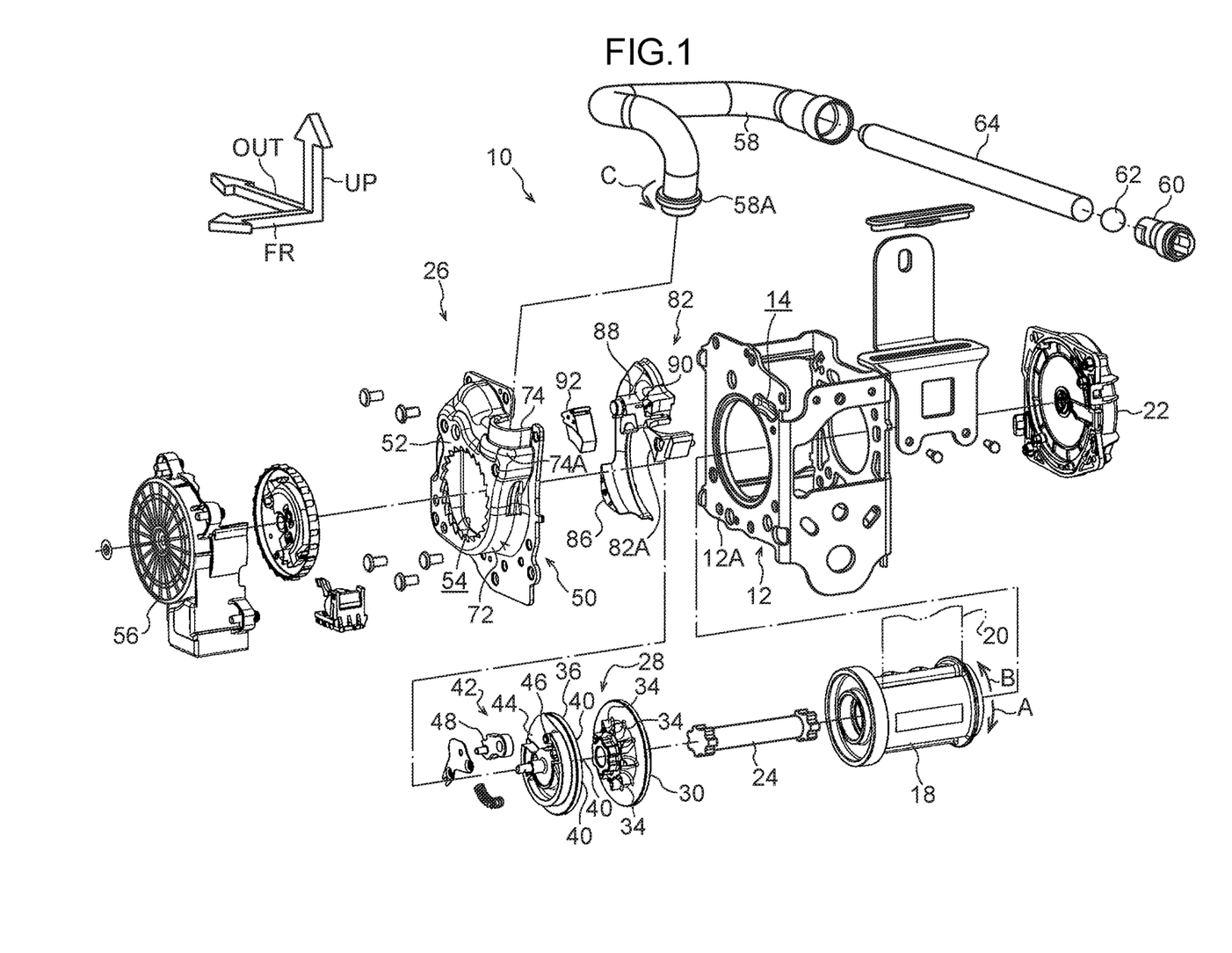
FIG. 1 is an exploded perspective view illustrating a webbing take-up device according to an exemplary embodiment of the present invention.
Figure 2:
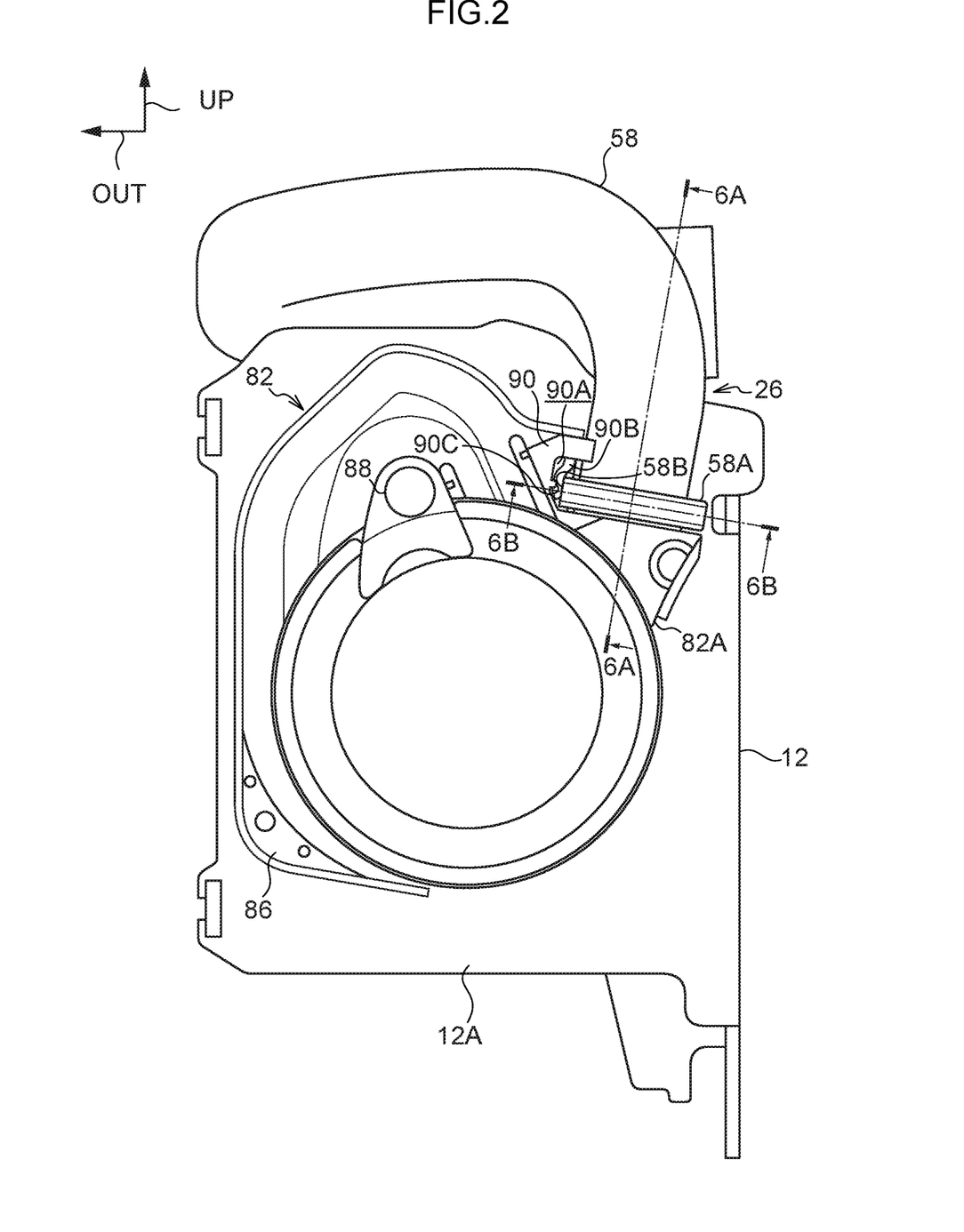
FIG. 2 is a side view illustrating a frame, a cylinder, and a guide member, as viewed from a vehicle front side.
Figure 3:
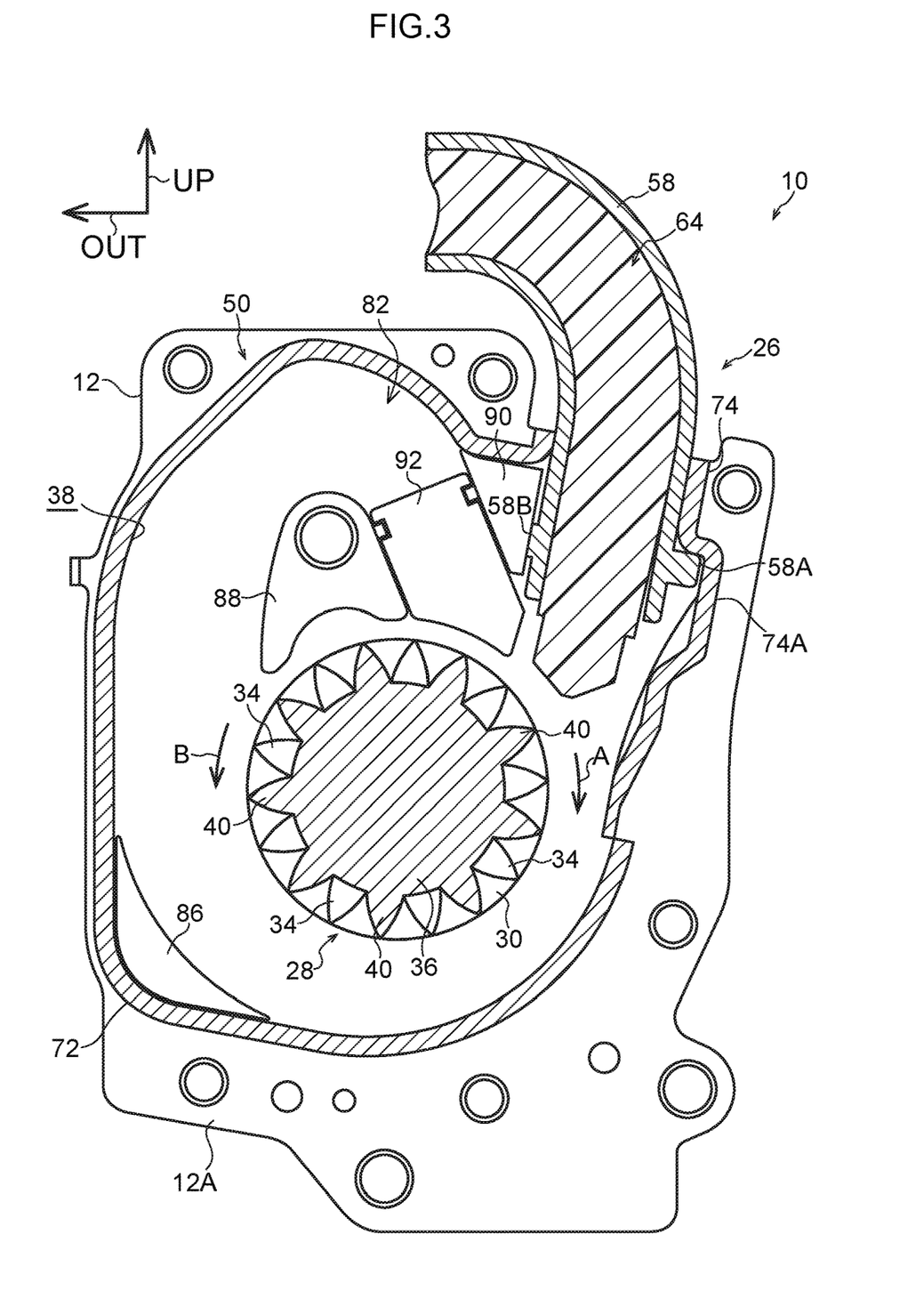
FIG. 3 is a side view illustrating the inside of a cover plate, as viewed from the vehicle front side.
Figure 4:
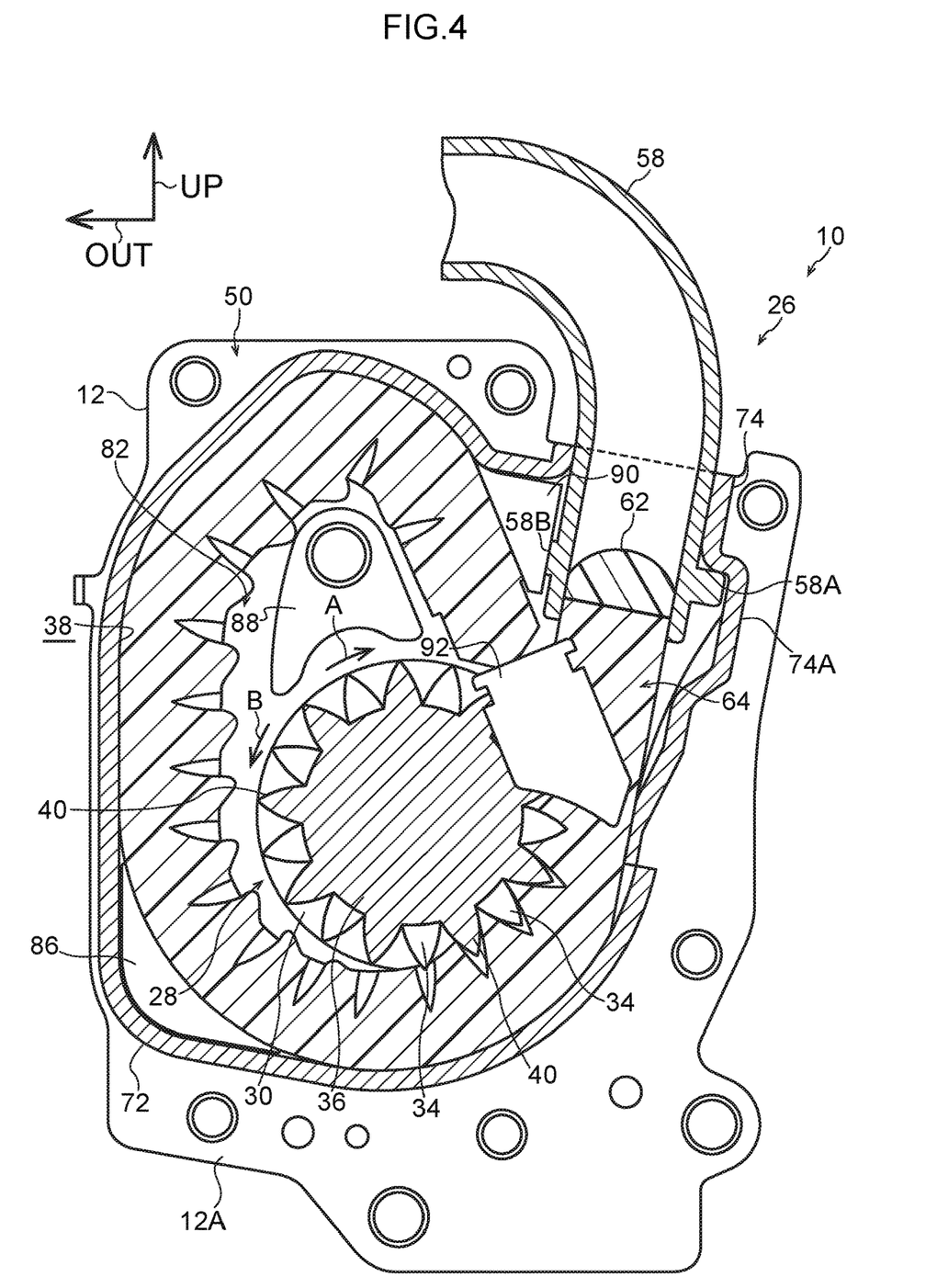
FIG. 4 is a side view corresponding to FIG. 3, illustrating a state in which a moving member has moved.
Figure 5A:
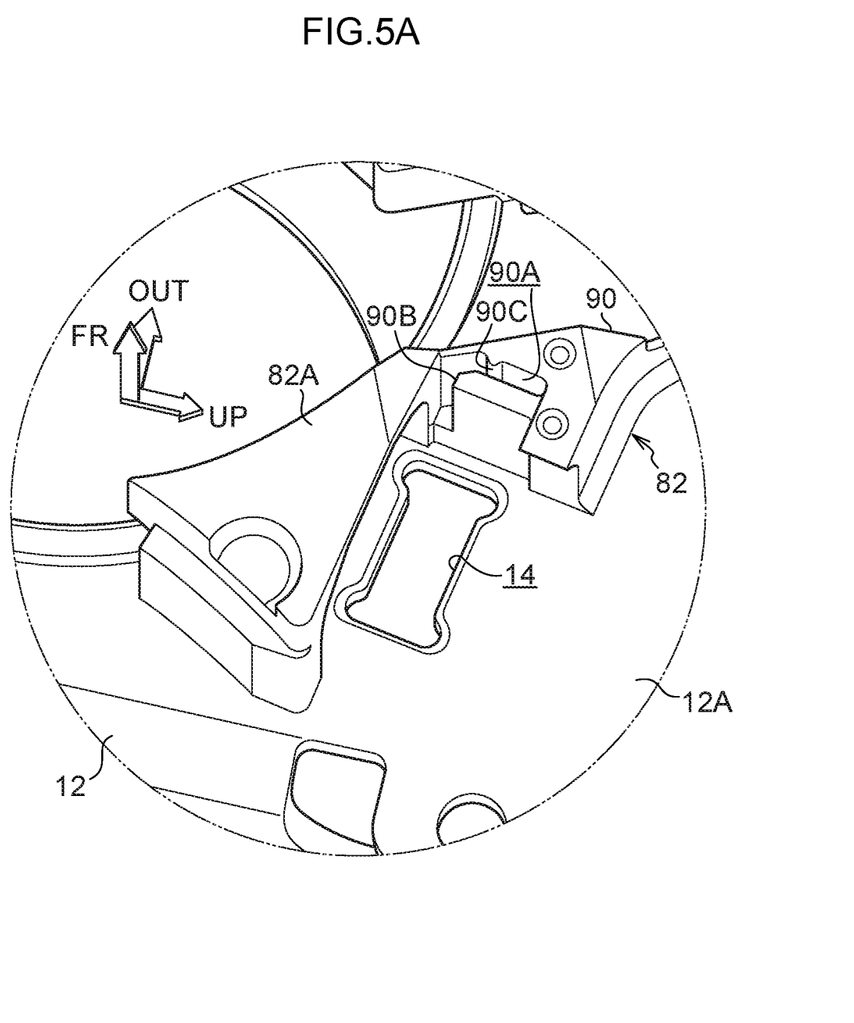
FIG. 5A is a perspective view illustrating relevant portions of the guide member.
Figure 5B:
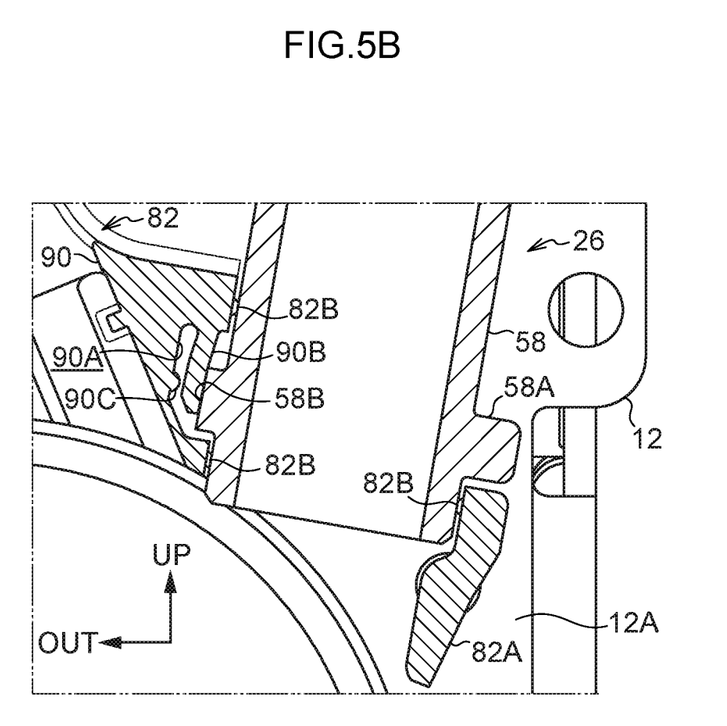
FIG. 5B is a cross-section (sectioned along line 5B-5B in FIG. 6B) illustrating an assembled configuration of the cylinder, as viewed from the vehicle front side.
Figure 6A:
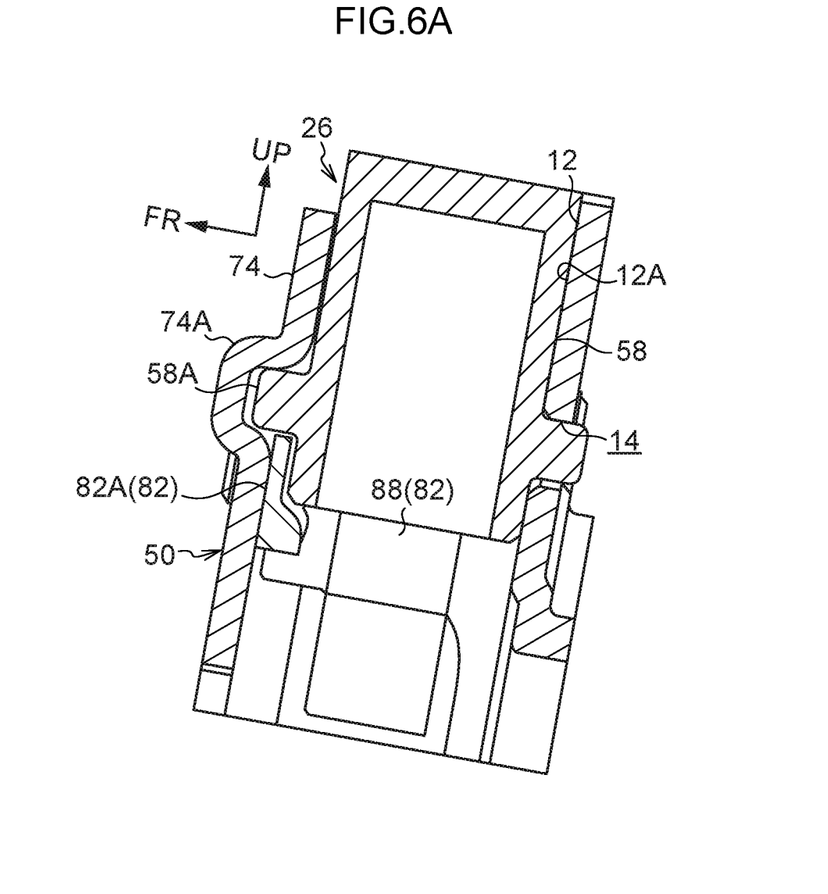
FIG. 6A is a cross-section (sectioned at the position of line 6A-6A in FIG. 2) illustrating the assembled configuration of the cylinder, as viewed from a vehicle width direction inside.
Figure 6B:
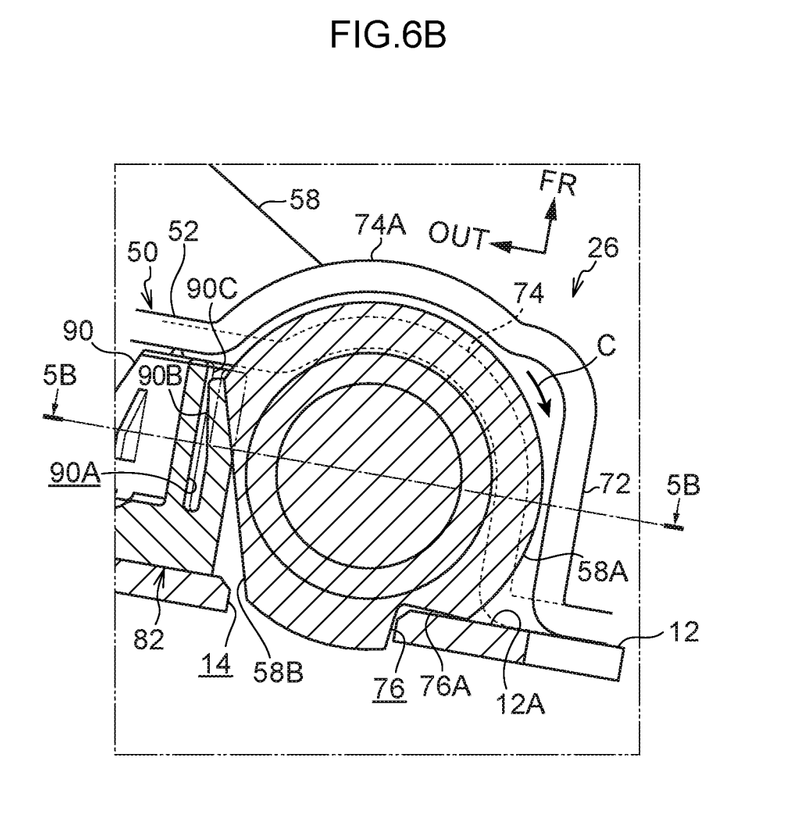
FIG. 6B is a cross-section (sectioned at the position of line 6B-6B in FIG. 2) illustrating the assembled configuration of the cylinder, as viewed from a vehicle lower side.

As illustrated in FIG. 1, a webbing take-up device 10 according to the present exemplary embodiment includes a substantially rectangular tube shaped frame 12 that is made of metal. The frame 12 is fixed to a vehicle lower side section of a center pillar (not illustrated in the drawings), serving as a vehicle body of a vehicle. A substantially rectangular shaped anchor hole 14 (see FIG. 5A) is formed penetrating a vehicle width direction inside and vehicle upper side portion of a leg plate 12A, serving as a restricting section at the vehicle front side of the frame 12. The anchor hole 14 extends substantially along the vehicle width direction.

A substantially circular tube shaped spool 18 is rotatably provided to the frame 12. The axial center of the spool 18 is disposed running parallel to a vehicle front-rear direction. A length direction base end portion of elongated belt shaped webbing 20 is anchored to the spool 18. When the spool 18 is rotated in a take-up direction (the arrow A direction in FIG. 1, etc.), the webbing 20 is taken up onto the spool 18, and when the webbing 20 is pulled out from the spool 18, the spool 18 is rotated in a pull-out direction (the arrow B direction in FIG. 1, etc.).

The webbing 20 leads out from the spool 18 toward the vehicle upper side, and passes through a through anchor (not illustrated in the drawings). The through anchor is supported by a vehicle upper side section of the center pillar, and the webbing 20 is folded back toward the vehicle lower side at the through anchor. A length direction leading end portion of the webbing 20 is anchored to an anchor plate (not illustrated in the drawings). The anchor plate is fixed to a vehicle width direction outside portion of a floor section (not illustrated in the drawings) of the vehicle. A tongue (not illustrated in the drawings) is provided so as to be capable of moving along the webbing 20, and the tongue is disposed between the through anchor and the anchor plate.

A vehicle seatbelt device applied with the webbing take-up device 10 includes a buckle device (not illustrated in the drawings). The buckle device is provided at the vehicle width direction inside of a seat (not illustrated in the drawings) applied with the webbing take-up device 10. In a state in which the webbing 20 has been pulled across the body of an occupant seated in the seat, the tongue of the webbing 20 is engaged with the buckle device so as to fit the webbing 20 over the body of the occupant.

A spring housing 22 is provided at the vehicle rear side of the frame 12. A spool urging means (not illustrated in the drawings) such as a flat spiral spring is provided inside the spring housing 22. The spool urging means directly or indirectly engages with the spool 18 such that the spool 18 is urged in the take-up direction by the urging force of the spool urging means.

The webbing take-up device 10 includes a torsion bar 24 configuring a force limiter mechanism. The torsion bar 24 is inserted inside the spool 18. A vehicle rear side portion of the torsion bar 24 is linked to the spool 18 in a rotation-limited state relative to the spool 18. A vehicle front side portion of the torsion bar 24 passes through a hole in the leg plate 12A of the frame 12 and extends to the outside (to the vehicle front side) of the frame 12.

A rotation member 28 of a pre-tensioner 26 is provided at the vehicle front side of the frame 12. The rotation member 28 includes a first rotation section 30. The first rotation section 30 is disposed coaxially to the spool 18. The vehicle front side portion of the torsion bar 24 is coupled to the first rotation section 30. Rotation of the rotation member 28 relative to the vehicle front side portion of the torsion bar 24 is limited. The first rotation section 30 includes plural first teeth 34, serving as engagement portions, at the vehicle front side and toward the inner side of the first rotation section 30. The first teeth 34 are formed at predetermined spacings about the axial center of the first rotation section 30.

A second rotation section 36 configuring the rotation member 28 is coaxially coupled to the vehicle front side of the first rotation section 30. Movement of the second rotation section 36 relative to the first rotation section 30 is limited. The second rotation section 36 includes plural second teeth 40, serving as engagement portions, at the vehicle rear side and toward the inner side of the second rotation section 36. The second teeth 40 are formed at predetermined spacings about the axial center of the second rotation section 36, and are arranged about the axial center of the rotation member 28 so as to be disposed at substantially central positions between the respective first teeth 34 of the first rotation section 30.

A vehicle front side portion of the second rotation section 36 configures a lock base 44 of a lock mechanism 42. A boss 46 is formed on the lock base 44. A lock pawl 48 is supported by the boss 46. The lock pawl 48 is capable of swinging about the boss 46.

A cover plate 50, serving as a fixing member configuring both the lock mechanism 42 and the pre-tensioner 26, is fixed to an outer side of the leg plate 12A of the frame 12. The cover plate 50 is substantially box shaped and is made of metal. The inside of the cover plate 50 is open toward the vehicle rear side, and a bottom plate 52 of the cover plate 50 opposes the frame 12 from the vehicle front side in a state separated from the frame 12. A substantially rectangular tube shaped side wall 72 is provided to the cover plate 50. The side wall 72 is disposed about an outer peripheral portion of the bottom plate 52, and the rotation member 28 is disposed at the interior of the side wall 72.

A ratchet hole 54 is formed in the bottom plate 52. Ratchet teeth are formed to an inner peripheral portion of the ratchet hole 54. Swinging of the lock pawl 48 of the lock base 44 causes a leading end portion of the lock pawl 48 to mesh with the ratchet teeth of the ratchet hole 54, thereby limiting rotation of the lock base 44 in the pull-out direction (the arrow B direction in FIG. 1, etc.). Rotation of the spool 18 in the pull-out direction is thus limited through the rotation member 28 and the torsion bar 24.

A substantially semicircular tube shaped insertion frame 74 (see FIG. 6A and FIG. 6B) is formed at a vehicle width direction inside and vehicle upper side portion of the cover plate 50. The inside of the insertion frame 74 is open toward the vehicle upper side. A restricting frame 74A, serving as an additional restricting section, that has an enlarged diameter, is coaxially formed to a vehicle lower side portion of the insertion frame 74. The restricting frame 74A opposes the anchor hole 14 in the leg plate 12A.

A sensor holder 56 of the lock mechanism 42 is provided at the vehicle front side of the cover plate 50. The inside of the sensor holder 56 is open toward the vehicle rear side. The sensor holder 56 is fixed to the frame 12, either directly or indirectly through the cover plate 50. A sensor mechanism (not illustrated in the drawings) that detects an emergency state of the vehicle is housed inside the sensor holder 56. When the sensor mechanism inside the sensor holder 56 is activated during a vehicle emergency, the lock pawl 48 of the lock base 44 is swung in coordination with pull-out direction rotation of the lock base 44 of the lock mechanism 42.

The webbing take-up device 10 includes a substantially circular tube shaped cylinder 58, serving as a guiding member configuring the pre-tensioner 26. An axial direction leading end portion of the cylinder 58 extends toward the vehicle lower side, and is inserted into the insertion frame 74 of the cover plate 50. A substantially annular plate shaped flange 58A (see FIG. 6A and FIG. 6B), serving as a peripheral portion, is coaxially formed around an outer periphery of the axial direction leading end portion (near to the axial direction leading end) of the cylinder 58. An external diameter dimension of the cylinder 58 is larger at the portion where the flange 58A is located. A substantially right-angled triangle shaped restriction notch 76, serving as a restricted portion, is formed in the flange 58A. The restriction notch 76 penetrates the flange 58A in its axial direction and is open toward the radial direction outside of the flange 58A. A face on the opposite side of the restriction notch 76 from a restricting direction (the arrow C direction in FIG. 1, etc.) configures a planar face shaped restricting face 76A. The restricting face 76A is disposed parallel to an axial direction and a chord direction of the flange 58A. A planar face shaped urging face 58B, serving as a urged portion, is formed to the flange 58A on the restricting direction side of the restriction notch 76. The urging face 58B is disposed parallel to the axial direction and a chord direction of the flange 58A.

The restricting face 76A of the flange 58A makes line contact or point contact with a vehicle width direction inside portion of the anchor hole 14 in the leg plate 12A, a vehicle width direction outside portion of the restriction notch 76 in the flange 58A is inserted into the anchor hole 14 in the leg plate 12A, and a portion of the flange 58A further toward the vehicle front side than the position of the restriction notch 76 is inserted into the restricting frame 74A of the cover plate 50. The flange 58A is fitted together with the anchor hole 14 and the restricting frame 74A in the axial direction, such that axial direction movement of the flange 58A is restricted by the anchor hole 14 and the restricting frame 74A. The flange 58A is fitted together with the leg plate 12A and the restricting frame 74A in the radial direction, such that radial direction movement of the flange 58A is restricted by the leg plate 12A and the restricting frame 74A.

The cylinder 58 is bent between the axial direction leading end portion and an axial direction base end side portion (a portion further toward the axial direction base end side than the axial direction leading end portion) thereof, and the axial direction base end side portion of the cylinder 58 is disposed perpendicular to a vehicle up-down direction. The axial direction base end side portion of the cylinder 58 is U-shaped and is disposed at the vehicle upper side of the frame 12. An axial direction base end portion of the cylinder 58 extends toward the vehicle width direction inside. A micro gas generator 60 (the micro gas generator 60 is hereafter referred to as the MGG 60), serving as an assembly section (a fluid supply means), is inserted into and assembled to the axial direction base end portion of the cylinder 58 from the vehicle width direction inside. The MGG 60 is electrically connected to a collision detection sensor provided to the vehicle through an ECU, serving as a control means (none of which are illustrated in the drawings). In a vehicle collision, when the collision is detected by the collision detection sensor, the MGG 60 is activated by the ECU so as to instantaneously generate high pressure gas (fluid) and, this gas is supplied into the cylinder 58.

A substantially spherical shaped sealing ball 62, serving as a piston, is disposed inside the cylinder 58. The sealing ball 62 is made of a synthetic resin and is fitted inside the cylinder 58. A substantially circular column shaped moving member 64 (see FIG. 3) is disposed inside the cylinder 58 further toward the axial direction leading end side than the sealing ball 62. The moving member 64 is made of a synthetic resin. When gas is generated by the MGG 60, the sealing ball 62 and the moving member 64 are moved toward the axial direction leading end side of the cylinder 58 under the pressure of this gas, such that the moving member 64 moves toward the vehicle lower side (an axial direction leading end side, one direction) at the vehicle lower side of the axial direction leading end of the cylinder 58. The moving member 64 is thus moved toward the vehicle lower side in a state in which the first teeth 34 and the second teeth 40 of the rotation member 28 (the first rotation section 30 and the second rotation section 36) dig into the moving member 64 (a biting state, an engaged state), thereby rotating the rotation member 28 in the take-up direction (see FIG. 4).

A guide member 82 (see FIG. 2) made of synthetic resin and serving as an additional guiding member is provided inside the cover plate 50 (at the interior of the side wall 72). The guide member 82 has a substantially C-shaped plate shaped profile, and is disposed at a vehicle lower side, a vehicle width direction outside, and a vehicle upper side portion inside the cover plate 50. The guide member 82 is formed with a first guide portion 86, a second guide portion 88, and a third guide portion 90. The first guide portion 86, the second guide portion 88, and the third guide portion 90 project toward the vehicle front side. The first guide portion 86 is disposed at a vehicle lower side and vehicle width direction outside corner of the guide member 82. The second guide portion 88 and the third guide portion 90 are respectively disposed at a vehicle width direction outside portion and a vehicle width direction inside portion of a vehicle upper side portion of the guide member 82. A frame shaped placement frame 82A with a substantially U-shaped cross-section is formed at a vehicle upper side and vehicle width direction inside end portion of the guide member 82. A vehicle width direction outside end portion of the placement frame 82A is integrally formed with the third guide portion 90, and the inside of the placement frame 82A is open toward the vehicle rear side. The flange 58A of the cylinder 58 is disposed at the vehicle upper side of the placement frame 82A, and a portion of the cylinder 58 at the vehicle lower side of the flange 58A is inserted inside the placement frame 82A. The first guide portion 86, the second guide portion 88, the third guide portion 90, and a vehicle width direction inside end portion of the placement frame 82A of the guide member 82 are fixed to the leg plate 12A of the frame 12 and to the bottom plate 52 of the cover plate 50.

A squashable ribs 82B (see FIG. 5B), serving as abutting portions, are formed projecting from a vehicle width direction inside face of the third guide portion 90 and an inner peripheral face of the placement frame 82A. The squashable ribs 82B abut the axial direction leading end portion of the cylinder 58 in squashed states, and fix the axial direction leading end portion of the cylinder 58.

Together with the side wall 72 of the cover plate 50, the first guide portion 86, the second guide portion 88, and the third guide portion 90 of the guide member 82 form a substantially ring shaped guide path 38 (see FIG. 3), serving as a movement path. The guide path 38 passes between the second guide portion 88 and the third guide portion 90. The guide path 38 is in communication with the inside of the axial direction leading end of the cylinder 58. When the moving member 64 is moved toward the vehicle lower side from the axial direction leading end of the cylinder 58, the moving member 64 moves toward the axial direction leading end side while being guided along the guide path 38 (see FIG. 4).

A substantially rectangular block shaped stopper 92 (see FIG. 3) is fitted between the second guide portion 88 and the third guide portion 90 of the guide member 82. The stopper 92 has a higher rigidity than the moving member 64, and a vehicle lower side portion of the stopper 92 has a triangular column shape. The stopper 92 is engaged with the second guide portion 88 and the third guide portion 90 so as to limit movement of the stopper 92 along the guide path 38. As the moving member 64 moves toward the axial direction leading end side along the guide path 38, an axial direction leading end of the moving member 64 presses against the stopper 92, thus releasing the engagement of the stopper 92 with the second guide portion 88 and the third guide portion 90 such that the stopper 92 is moved along the guide path 38 by the moving member 64 (see FIG. 4). The stopper 92 thereby digs into the moving member 64 at the vehicle width direction inside of the rotation member 28, such that the movement of the stopper 92 is stopped and movement of the moving member 64 toward the axial direction leading end side is stopped.

A urging hole 90A (see FIG. 5A) with a substantially columnar L-shape is formed in the third guide portion 90. The urging hole 90A is open toward the vehicle front side of the third guide portion 90. A vehicle upper side portion of the urging hole 90A extends substantially along the vehicle up-down direction, a vehicle lower side portion of the urging hole 90A extends substantially along the vehicle width direction, and the vehicle lower side portion of the urging hole 90A is open toward the vehicle width direction inside. A rectangular plate shaped urging plate 90B (see FIG. 5A), serving as a force application portion, is formed inside the urging hole 90A of the third guide portion 90. The vehicle upper side and the vehicle rear side of the urging plate 90B are integrally formed with the third guide portion 90. A substantially semicircular column shaped limiting protrusion 90C (see FIG. 5A), serving as a limiting portion, is formed projecting from a vehicle width direction outside face of the vehicle upper side portion of the urging hole 90A. The limiting protrusion 90C extends along the vehicle front-rear direction and opposes a vehicle lower side portion of the urging plate 90B in substantially the vehicle width direction. The urging plate 90B is abutted by the urging face 58B of the flange 58A of the cylinder 58 (see FIG. 5B and FIG. 6B), and the urging plate 90B is elastically deformed by the urging face 58B so as to tilt in a direction toward the vehicle width direction outside on progression toward the vehicle front side. The urging plate 90B abuts the limiting protrusion 90C such that the limiting protrusion 90C limits the elastic deformation of the urging plate 90B by the urging face 58B. The urging plate 90B urges the urging face 58B toward the vehicle width direction inside, such that the flange 58A is urged toward the restricting direction side by the urging plate 90B.

Operation and Advantageous Effects of Present Exemplary Embodiment

Next, explanation follows regarding operation and advantageous effects of the present exemplary embodiment.

In the webbing take-up device 10, the urging plate 90B of the guide member 82 urges the urging face 58B of the flange 58A of the cylinder 58 toward the restricting direction side, and the vehicle width direction inside portion of the anchor hole 14 in the leg plate 12A of the frame 12 restricts rotation of the restricting face 76A of the flange 58A toward the restricting direction side. Thus, even in cases in which the axial direction dimension by which the axial direction leading end portion of the cylinder 58 overlaps with the leg plate 12A and the cover plate 50 is small, rattling of the flange 58A about the axial direction can be suppressed and rattling of the axial direction leading end portion of the cylinder 58 about the axial direction can be suppressed when the vehicle vibrates and so on during travel, thereby enabling the generation of abnormal noise between the cylinder 58 and the cover plate 50 and leg plate 12A to be suppressed.

Furthermore, in the guide member 82, the limiting protrusion 90C limits the elastic deformation of the urging plate 90B by the flange 58A (urging face 58B). This enables the urging plate 90B to effectively apply the urging face 58B of the flange 58A with rotation force toward the restricting direction side, thereby enabling rattling of the flange 58A about the axial direction to be effectively suppressed.

Moreover, the urging plate 90B is provided to the guide member 82. This obviates the need to provide the urging plate 90B separately to the guide member 82, enabling the configuration to be simplified.

Furthermore, during assembly of the MGG 60 inside the axial direction base end portion of the cylinder 58, rotation force toward the restricting direction side is applied to the flange 58A of the cylinder 58. The leg plate 12A restricts rotation of the restricting face 76A of the flange 58A toward the restricting direction side, thus enabling assembly of the MGG 60 inside the axial direction base end portion of the cylinder 58 to be facilitated.

Moreover, the flange 58A is provided to the axial direction leading end portion of the cylinder 58. The urging plate 90B applies rotation force toward the restricting direction side on the urging face 58B of the flange 58A, the leg plate 12A restricts rotation of the restricting face 76A of the flange 58A toward the restricting direction side, and the anchor hole 14 in the leg plate 12A and the restricting frame 74A of the cover plate 50 restrict axial direction movement of the flange 58A. Thus, rotation force toward the restricting direction side can be easily applied to the axial direction leading end portion of the cylinder 58, rotation of the axial direction leading end portion of the cylinder 58 toward the restricting direction side can be easily restricted, and axial direction movement of the axial direction leading end portion of the cylinder 58 can be easily restricted.

Figure 7A:
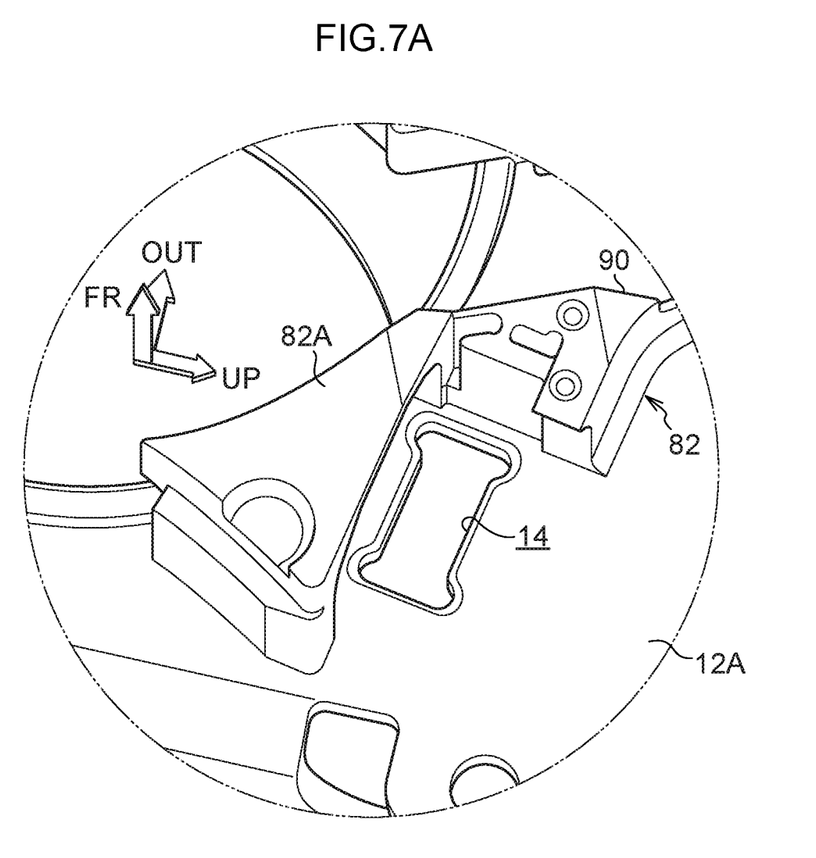
FIG. 7A is a perspective view illustrating relevant portions of a modified example of a guide member.
Figure 7B:
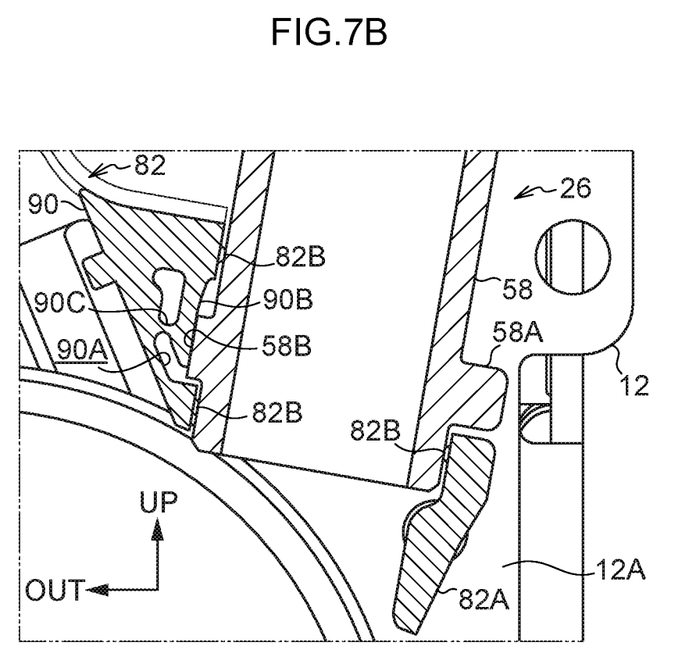
FIG. 7B is a cross-section (sectioned at the position of line 5B-5B in FIG. 6B) illustrating a modified example of an assembled configuration of a cylinder, as viewed from the vehicle front side.

Note that in the present exemplary embodiment, the urging plate 90B and the limiting protrusion 90C of the guide member 82 are separated from one another in substantially the vehicle width direction. However, as illustrated in FIG. 7A and FIG. 7B, the urging plate 90B and the limiting protrusion 90C of the guide member 82 may be integrally connected to one another in substantially the vehicle width direction.

The entire content of the disclosure of Japanese Patent Application No. 2018-31170 filed on Feb. 23, 2018 is incorporated by reference in the present specification.

EXPLANATION OF REFERENCE NUMERALS

10 webbing take-up device
12A leg plate (restricting section)
18 spool
20 webbing
58 cylinder (guiding member)
58A flange (peripheral portion)
60 MGG (assembly section)
64 moving member
82 guide member (additional guiding member)
90B urging plate (force application portion)
90C limiting protrusion (limiting portion)

The invention claimed is:

1. A webbing take-up device comprising:
   a spool configured to be rotated in a take-up direction to take up a webbing of a seatbelt device;
   a moving member configured to be moved in one direction to rotate the spool in the take-up direction;
   a guiding member configured to guide movement of the moving member in the one direction;
   a force application portion located separately from the guiding member and configured to apply rotation force about the one direction to the guiding member; and
   a restricting section configured to restrict the guiding member from being rotated about the one direction by the force application portion.

2. The webbing take-up device of claim 1, further comprising an additional guiding member that is provided with the force application portion and that is configured to guide the moving member as the moving member moves from the guiding member in the one direction.

3. The webbing take-up device of claim 1, further comprising an assembly section that is assembled to the guiding member, and wherein the restricting section is configured to restrict rotation of the guiding member during assembly of the assembly section to the guiding member.

4. The webbing take-up device of claim 1, further comprising a limiting portion that is disposed on a side toward which the force application portion is deformed by the guiding member, and that is configured to limit deformation of the force application portion by the guiding member.

5. The webbing take-up device of claim 4, wherein the limiting portion is integrally formed with the force application portion.

6. The webbing take-up device of claim 1, further comprising:
   a peripheral portion that is provided at a periphery of the guiding member, at which the force application portion applies the rotation force about the one direction to the guiding member and the restricting section restricts the guiding member from being rotated about the one direction by the force application portion, and at which movement of the guiding member in the one direction and in another direction is restricted.

7. The webbing take-up device of claim 6, further comprising an anchor hole that is provided at the restricting section and into which the peripheral portion is inserted.

8. The webbing take-up device of claim 1, wherein the force application portion is configured to urge the guiding member so as to apply rotation force about the one direction to the guiding member.

\* \* \* \* \*